United States Patent [19]

Mizutani et al.

[11] Patent Number: 5,118,726

[45] Date of Patent: Jun. 2, 1992

[54] POLYCARBONATE RESIN COMPOSITION FOR RADIATION STERILIZATION

[75] Inventors: Makoto Mizutani; Satoshi Nagai, both of Kanagawa; Mitsuhiko Masumoto; Toshiaki Aso, both of Osaka, all of Japan

[73] Assignee: Mitsubishi Gas Chemical Co., Ltd., Tokyo, Japan

[21] Appl. No.: 458,064

[22] Filed: Dec. 28, 1989

[30] Foreign Application Priority Data

Dec. 28, 1988 [JP] Japan .................. 63-329353
Mar. 10, 1989 [JP] Japan .................. 1-56290
Apr. 5, 1989 [JP] Japan .................. 1-84910

[51] Int. Cl.⁵ .................. C08K 5/54; C08K 5/526; C08K 5/10; C08K 5/06; C08K 5/05

[52] U.S. Cl. .................. 523/136; 524/150; 524/265; 524/308; 524/376; 524/377; 524/378

[58] Field of Search .................. 524/308, 265, 376, 377, 524/378, 150; 523/136, 137

[56] References Cited

U.S. PATENT DOCUMENTS

| | | | |
|---|---|---|---|
| 3,254,047 | 5/1966 | Caldwell et al. | 524/369 |
| 3,334,154 | 8/1967 | Kim | 528/191 |
| 4,036,719 | 7/1977 | Lyons | 523/136 |
| 4,172,858 | 10/1979 | Clubley et al. | 524/369 |
| 4,624,972 | 11/1986 | Nace | 523/136 |
| 4,804,692 | 2/1989 | Lundy et al. | 523/137 |
| 4,873,271 | 10/1989 | Lundy et al. | 523/136 |
| 4,880,853 | 11/1989 | Nelson et al. | 523/136 |
| 4,904,710 | 2/1990 | Nace | 524/377 |

FOREIGN PATENT DOCUMENTS

| | | |
|---|---|---|
| 152012 | 8/1985 | European Pat. Off. |
| 0218215 | 4/1987 | European Pat. Off. |
| 228525 | 7/1987 | European Pat. Off. |
| 296473 | 12/1988 | European Pat. Off. |
| 0315865 | 5/1989 | European Pat. Off. |
| 0359366 | 3/1990 | European Pat. Off. |
| 8502622 | 6/1984 | PCT Int'l Appl. |

Primary Examiner—Veronica P. Hoke
Attorney, Agent, or Firm—Sughrue, Mion, Zinn, Macpeak & Seas

[57] ABSTRACT

A polycarbonate resin composition for radiation sterilization, comprising an aromatic polycarbonate resin having structural units derived from a halogenated bisphenol, and a polyalkylene compound selected from poly(alkylene glycol), its ether, silyl ether or ester. Molded articles produced from the composition do not substantially undergo yellowing when exposed to radiation in air or under a substantially oxygen-free atmosphere, and can be advantageously employed in medical appliances.

5 Claims, No Drawings

POLYCARBONATE RESIN COMPOSITION FOR RADIATION STERILIZATION

FIELD OF THE INVENTION

The present invention relates to a polycarbonate resin composition having excellent radiation resistance. Molded articles produced by using the polycarbonate resin composition of this invention undergo only little yellowing when exposed to radiation in the air or under an atmosphere of substantially no oxygen, and can be advantageously employed in medical appliances to be used after radiation-sterilization in the air or under an oxygen-free atmosphere.

BACKGROUND OF THE INVENTION

Aromatic polycarbonate resins are frequently used in medical products due to their high impact resistance, heat resistance, and transparency and good safety.

For application of aromatic polycarbonates in medical products, the high-pressure steam sterilization method and the ethylene oxide gas (EOG) sterilization method have conventionally been employed. However, the steam sterilization method has disadvantages that complete sterilization is difficult and the treatment procedures have drawbacks such as the necessity of a drying step after the sterilization. Further, the EOG sterilization method has problems such as the toxicity of residual EOG absorbed in the sterilized materials.

For this reason, attention has recently focused on radiation sterilization in which products to be sterilized are exposed to radiation (generally, gamma rays and electron beams) and which can be practiced at relatively low costs under a low temperature and dry atmosphere, and also has focused on oxygen-free radiation sterilization in which products are sterilized under substantially oxygen-free conditions for the purposes of suppressing the multiplication of microorganisms and preventing the deterioration of hollow fibers made of cellulose acetate, etc.

However, polycarbonate resin molded articles conventionally used in those fields have a defect that upon exposure to radiation, the articles suffer yellowing due to the decomposition of the resin, thus lessening the value of the products. This tendency becomes very strong where the radiation sterilization is conducted under a substantially oxygen-free atmosphere.

JP-A-62-135556 discloses a composition which is prepared by blending a polyether polyol or its alkyl ether with an ordinary polycarbonate resin containing no halogen, thereby showing improved resistance to yellowing caused by irradiation. (The term "JP-A" as used herein means an "unexamined published Japanese patent application".) However, the improvement in diminishing the irradiation-caused yellowing is insufficient, and particularly, in a substantially oxygen-free atmosphere, almost no effects are brought about. In addition, the above-proposed polycarbonate resin composition is defective in that the addition of a polyether polyol or its alkyl ether often results in poor heat stability of the composition.

SUMMARY OF THE INVENTION

The present inventors have conducted intensive studies to develop a polycarbonate resin composition which can be molded into medical products suitable for sterilization by irradiation. As a result, they have found that a polycarbonate resin composition obtained by blending a poly(alkylene glycol) or its ether, silyl ether, or ester with an aromatic polycarbonate containing in its molecular chain a structural unit derived from a halogenated bisphenol can be greatly prevented from suffering yellow discoloration even where radiation sterilization is performed under a substantially oxygen-free atmosphere, as well as in the air. This invention has been completed based on the above finding.

The polycarbonate resin composition for radiation sterilization according to the present invention comprises (A) an aromatic polycarbonate resin containing an aromatic polycarbonate polymer or oligomer having in its molecular chain a structural unit derived from a halogenated bisphenol and, (B) a polyalkylene compound selected from the group consisting of poly(alkylene glycol)s, poly(alkylene glycol) ethers, poly(alkylene glycol) silyl ethers and poly(alkylene glycol) esters and represented by the following formula (1):

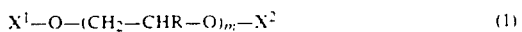

wherein R represents hydrogen or a lower alkyl group (e.g., methyl or ethyl), $X^1$ and $X^2$ each represents hydrogen, an alkyl group having 1 to 10 carbon atoms, an acyl group having 2 to 35 carbon atoms, an aryl group having 6 to 12 carbon atoms, or $-Si(R^1)_3$ group, wherein $R^1$ which may be the same or different each represents an alkyl group having 1 to 10 carbon atoms or an aryl group having 6 to 10 carbon atoms, and m is an integer of 1 to 1,000.

In preferred embodiments of this invention, the aromatic polycarbonate resin (A) has a halogen content in the range of from 0.1 to 10% by weight, more preferably from 0.5 to 5% by weight; the amount of the polyalkylene compound (B) of the formula (1) added is in the range of from 0.1 to 5% by weight, more preferably from 0.1 to 3% by weight, and the (B) is an ester.

In other preferred embodiments, the polycarbonate resin composition of this invention further comprises at least one release agent selected from the group consisting of esters of saturated higher fatty acids with saturated alcohols, paraffins, and low molecular weight polyolefins, the amount of the at least one release agent added to the composition being in the range of from 0.01 to 3% by weight, more preferably from 0.1 to 1% by weight, and/or at least one heat stabilizer selected from the group consisting of phosphorous acid and phosphorous esters, the amount of the at least one heat stabilizer added to the composition being in the range of from 0.001 to 0.1% by weight.

DETAILED DESCRIPTION OF THE INVENTION

The aromatic polycarbonate polymer or oligomer, which constitutes component (A) of the composition of this invention and contains in its molecular chain a structural unit derived from a halogenated bisphenol, is an aromatic polycarbonate resin or oligomer which is produced using a halogenated bisphenol as part or all of the dihydric phenol(s) and which itself is conventionally known. Preferred examples thereof include (a) an aromatic polycarbonate copolymer produced using a halogenated bisphenol as part of the dihydric phenols, (b) an aromatic polycarbonate homooligomer produced using a halogenated bisphenol as the dihydric phenol, and (c) an aromatic polycarbonate cooligomer produced using a halogenated bisphenol as part of the dihydric phenols. Although halogenated bisphenol monomers are also effective in the prevention of yellowing by irradiation, they are not so preferred because of their poor heat stability.

Specific examples of the aromatic polycarbonate resin (A) in the composition of this invention include: (1) an aromatic polycarbonate resin consisting of the above (a) alone: (2) a composition consisting of (a) above and any of the above (b) and (c) and an aromatic polycarbonate oligomer derived from a dihydric phenol containing no halogen: and (3) a composition consisting of an aromatic polycarbonate resin derived from a dihydric phenol containing no halogen and any of the above (a), (b), and (c).

Examples of the halogenated bisphenol include bis(4-hydroxy-3,5-dibromophenyl)methane, 2,2-bis(4-hydroxy-3,5-dibromophenyl)propane, 4,4,-dihydroxy-3,3,,5,5,-tetrabromodiphenyl sulfide, 2,2-bis(4-hydroxy-3,5-dichlorophenyl)propane, 2,2-bis(4-hydroxy-3-bromophenyl)propane, bis(4-hydroxy-3-chlorophenyl)methane, bis(4-hydroxy-3,5-dichlorophenyl)methane, and bis(4-hydroxy-3-bromophenyl)methane. Examples of the dihydric phenol containing no halogen include bis(4-hydroxyphenyl)methane, bis(4-hydroxyphenyl) ether, bis(4-hydroxyphenyl) sulfone, bis(4-hydroxyphenyl) sulfoxide, bis(4-hydroxyphenyl) sulfide, bis(4-hydroxyphenyl) ketone, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl)cyclohexane, 2,2-bis(4-hydroxy-3,5-dimethylphenyl)propane, 1,1-bis(4-hydroxyphenyl)-1-phenylethane, and bis(4-hydroxyphenyl)diphenylmethane.

Examples of terminators (molecular weight modifiers) which can be used in the production of the aromatic polycarbonate polymer or oligomer include ordinarily employed ones such as phenol, p-t-butylphenol, and tribromophenol. In addition to these, examples thereof further include: long chain alkyl-substituted phenols such as octylphenol, nonylphenol, laurylphenol, palmitylphenol, and stearylphenol; long chain alkyl esters of hydroxybenzoic acid such as octyl hydroxybenzoate, lauryl hydroxybenzoate, nonyl hydroxybenzoate, and stearyl hydroxybenzoate; (long chain alkyl)oxyphenols such as octyl ether phenol (=octyloxyphenol), nonyl ether phenol, lauryl ether phenol, palmityl ether phenol, octadecyloxyphenol, and dodecyloxyphenol; and aliphatic acid chlorides such as capric acid chloride, lauric acid chloride, myristic acid chloride, palmitic acid chloride, stearic acid chloride, and cerotic acid chloride.

In producing the aromatic polycarbonate polymer or oligomer according to this invention, a chain-branching agent may be used in combination with the chain terminator in an amount of from 0.01 to 3 mol, preferably from 0.1 to 1.0 mol, per 100 mol of the dihydric phenol compound, thereby to give a branched polycarbonate. Examples of such chain-branching agent include polyhydroxy compounds such as phloroglucinol, 2,6-dimethyl-2,4,6-tri(4-hydroxyphenyl)heptene-3, 4,6-dimethyl-2,4,6-tri(4-hydroxyphenyl)heptene-2, 1,3,5-tri(2-hydroxyphenyl)benzole, 1,1,1-tri(4-hydroxyphenyl)ethane, 2,6-bis(2-hydroxy-5-methylbenzyl)-4-methylphenol, and α,α',α"-tri(4-hydroxyphenyl)-1,3,5-triisopropylbenzene, and further include 3,3-bis(4-hydroxyaryl)oxyindol (=isatin bisphenol), 5-chloroisatin, 5,7-dichloroisatin, and 5-bromoisatin.

Of the above-described polycarbonates, examples of polycarbonate resin (A) which are preferably used in producing the polycarbonate resin composition for radiation sterilization according to this invention include: (1) a copolycarbonate resin derived from 2,2-bis(4-hydroxyphenyl)propane (=bisphenol A) and 2,2-bis(4-hydroxy-3,5-dibromophenyl)propane (=tetrabromobisphenol A); (2) a composition comprised of bisphenol A polycarbonate resin and the copolycarbonate resin (1) above; and (3) a composition comprised of bisphenol A polycarbonate resin and either of a tetrabromobisphenol A polycarbonate oligomer terminal-blocked with p-t-butylphenol, tribromophenol, etc., and a terminal-blocked copolycarbonate oligomer derived from bisphenol A and tetrabromobisphenol A.

A too low or too high halogen atom content in the composition of this invention (or in the polycarbonate resin) is not preferred, because the effect of preventing irradiation-caused yellow discoloration cannot be produced with too low a halogen atom content, while too high a halogen atom content impairs the mechanical properties and heat resistance of the composition. Therefore, the halogen atom content in the polycarbonate resin (A) is preferably from 0.1 to 10% by weight, more preferably from 0.3 to 5% by weight.

The polyalkylene compound of component (B) according to the present invention is obtained by the ring-opening polymerization of an alkylene oxide such as ethylene oxide, propylene oxide, or butylene oxide. In this invention, such polyalkylene compound can be used as it is, or after being etherified, silyl-etherified, or esterified.

Specific examples of component (B) include poly(alkylene glycol)s such as poly(ethylene glycol) and poly(propylene glycol); alkyl-etherified products such as poly(ethylene glycol) dimethyl ether, poly(propylene glycol) dimethyl ether, poly(ethylene glycol) diethyl ether, poly(propylene glycol) diethyl ether, poly(ethylene glycol) dipropyl ether, poly(propylene glycol) dipropyl ether, poly(ethylene glycol) dibutyl ether, and poly(propylene glycol) dibutyl ether; silyl-etherified products such as reaction products of poly(propylene glycol) with chlorotrimethylsilane or chlorotriethylsilane; and esters of poly(alkylene glycol)s with aliphatic or aromatic carboxylic acids, such as poly(ethylene glycol) diacetate, poly(propylene glycol) diacetate, poly(ethylene glycol) dipropionate, poly(propylene glycol) dipropionate, poly(ethylene glycol) distearate, poly(propylene glycol) distearate, poly(propylene glycol) dilaurate, and poly(propylene glycol) dibehenate. Of these, poly(alkylene glycol) esters are most preferably used.

The amount of component (B) in the composition is from 0.1 to 5% by weight, preferably from 0.3 to 3% by weight, based on the weight of compound (A). If the amount thereof is below 0.1% by weight, the yellowing by irradiation cannot be prevented sufficiently. On the other hand, an amount thereof exceeding 5% by weight is not preferred in that not only the effect of preventing yellow discoloration cannot be heightened any more, but also the mechanical properties and heat resistance of the composition are impaired.

The composition of this invention, which comprises the above-described components (A) and (B) as essential components, may preferably further contain a release agent in order to improve moldability of the composition. It is also preferred to add a heat stabilizer for improving heat stability of the composition.

The release agent is not particularly limited so long as it is a known release agent which is generally used for polycarbonate resins and contains substantially no olefinically unsaturated carbon-carbon double bonds in its molecule. Examples of such release agent include: esters or partial esters of saturated higher fatty acids (such as stearic acid, palmitic acid, myristic acid, and behenic acid) with saturated alcohols (such as butyl alcohol, hexyl alcohol, octyl alcohol, nonyl alcohol, lauryl alcohol, myristyl alcohol, stearyl alcohol, behenyl alcohol, ethylene glycol, propylene glycol, butanediol, hexanediol, glycerin, butanetriol, pentanetriol, erythritol, and pentaerythritol); and waxes such as paraffins, low molecular weight polyolefins, and others. Particularly preferred of these are, for example, glyceryl monostearate, glyceryl distearate, glyceryl tristearate, pentaerythritol tetrastearate, pentaerythritol tetrabehenate, pentaerythritol tetralaurate, and pentaerythritol tetramyristate. The amount of the release agent added is from 0.01 to 3% by weight, preferably from 0.1 to 1% by weight, based on the weight of component (A).

The heat stabilizer is preferably selected from phosphorous acid and phosphorous esters. Examples thereof include phosphorous acid, triphenyl phosphite, tris(-nonylphenyl) phosphite, tris(2-ethylhexyl) phosphite, tridecyl phosphite, tristridecyl phosphite, diphenyl mono(2-ethylhexyl) phosphite, diphenyl monodecyl phosphite, diphenyl monotridecyl phosphite, dilauryl hydrogen phosphite, diphenyl hydrogen phosphite, tetraphenyl di(propylene glycol) diphosphite, tetratridecyl 4,4'-isopropylidenediphenyl phosphite, trilauryl trithio phosphite, bistridecyl pentaerythritol diphosphite, bisnonylphenyl pentaerythritol diphosphite, bis(2,4-di-t-butylphenyl) pentaerythritol diphosphite, bis(2,6-di-t-butylphenyl) pentaerythritol diphosphite, distearyl pentaerythritol diphosphite, and tris(2,4-di-t-butylphenyl) phosphite, and also include a hydrogenated Bisphenol, a phosphite polymer typically represented by the following formula:

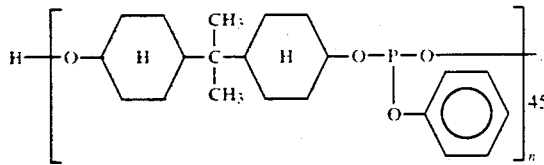

Preferred of these heat stabilizers are phosphorous acid, tris(2,4-di-t-butylphenyl)phosphite(M2112),tris(-nonylphenyl) phosphite,bis(2,4-di-t-butylphenyl)pentaerythritoldiphophite (PEP24), bis(2,6-di-t-butylphenyl) pentaerythritol diphosphite (PEP36), distearyl pentaerythritol diphosphite (PEP8), and hydrogenated bisphenol A phosphite polymer (HBP). The amount of the heat stabilizer added to the composition is from 0.001 to 0.1% by weight based on the weight of component (A).

Using the above-described components, the polycarbonate resin composition of this invention can be usually obtained by mixing the components simultaneously or successively, extruding the resulting mixture by means of an extruder having a cylinder temperature of 250 to 320° C., and then shaping the extrudate into pellets. Conditions under which the thus-obtained composition of the invention is formed into polycarbonate molded articles for radiation sterilization vary depending upon the viscosity average molecular weight of the aromatic polycarbonate resin used, kind of the dihydric phenol used, kind of the terminator, kind and amount of the polyalkylene compound, kind and amount of the release agent, content of the halogenated bisphenol, etc. In general, however, molded articles are manufactured by injection molding at 260° to 340° C.

The polycarbonate resin composition of this invention, from which polycarbonate molded articles for radiation sterilization can be produced comprises the above-described essential components (A) and (B) and if required and necessary, further comprises a release agent and a heat stabilizer as described above. Further, other additives not denaturing under irradiation may be added thereto according to need for the purpose of improving moldability and for other purposes.

The present invention will be now explained in more detail by reference to the following Synthesis Examples, Examples, and Comparative Examples, in which all percents and parts are by weight unless otherwise indicated.

SYNTHESIS EXAMPLE 1

Into a 100 liter reactor were introduced 8.1 kg of bisphenol A (hereinafter referred to as "BPA"), 750 g of tetrabromobisphenol A (hereinafter referred to as "TBA"), 42 liters of a 9% aqueous sodium hydroxide solution, and 30 liters of methylene chloride (hereinafter referred to as "MC"). 4.2 kg of phosgene was blown into the resulting mixture over a period of 30 minutes, while the mixture was being stirred and maintained at about 20° C.

209 g of p-tert-butylphenol (hereinafter referred to as "PTBP") dissolved in 2 liters of MC and 7 ml of triethylamine (hereinafter referred to as "TEA") were added to the above-obtained reaction mixture, and stirring was continued for about 1 hour to proceed polymerization.

The resulting polymerization mixture was separated into an aqueous phase and an organic phase. The organic phase was neutralized with phosphoric acid, and then washed with water repeatedly until the pH of the washings became neutral. 35 liters of isopropanol were added to the organic phase to precipitate the polymer formed. The precipitate was filtered off and then dried, thereby obtaining a white powdery polycarbonate copolymer (hereinafter referred to as "C-PC").

The viscosity average molecular weight of the C-PC was 25,000, and the bromine (Br) content was 4.46% as calculated from the amount of the monomer reacted in the polymerization.

SYNTHESIS EXAMPLE 2

Into a 100 liter reactor were introduced 9 kg of TBA, 30 liters of 9% aqueous sodium hydroxide solution, 10 liters of water, 23 liters of MC, and 6 ml of TEA. 2.5 kg of phosgene was blown into the resulting mixture over a period of 30 minutes, while the mixture was being stirred and maintained at about 20° C.

970 g of PTBP dissolved in 10 liters of MC and 50 ml of TEA were added to the above-obtained reaction mixture, and stirring was continued for about 1 hour to proceed polymerization.

The resulting organic phase was purified in the same manner as in Synthesis Example 1 above, and the solvent in the organic phase was then evaporation-removed to obtain a dry residue. Thus, there was obtained a white powdery polycarbonate homooligomer (hereinafter referred to as "HO-PC") having an average degree of polymerization of 5 and a Br content of 50.3%.

SYNTHESIS EXAMPLE 3

Into a 100 liter reactor were introduced 9.8 kg of TBA, 30 liters of water, 37 liters of MC, 4 liters of a 9% aqueous sodium hydroxide solution, and 4.9 g of triethylbenzylammonium chloride. 3.8 kg of phosgene was blown into the resulting mixture over a period of 30 minutes, while the pH and temperature of the mixture were maintained at 11.0 to 11.8 and about 20° C., respectively. The pH adjustment was conducted by adding 35% aqueous sodium hydroxide solution.

The reaction mixture was subsequently transferred to a 150 liter reactor, and a solution prepared by dissolving 19 liters of a 9% aqueous sodium hydroxide solution, 2.2 kg of BPA, and 1.65 kg of PTBP in 15 liters of MC was added to the transferred reaction mixture. Further, 450 g of TEA was added thereto, and stirring was continued for about 1 hour to proceed polymerization.

The resulting reaction mixture was treated in the same manner as in Synthesis Example 2 above, thereby obtaining a white powdery polycarbonate cooligomer (hereinafter referred to as "CO-PC") having an average degree of polymerization of 5 and a Br content of 39.7%.

EXAMPLES 1 to 13 AND COMPARATIVE EXAMPLES 1 to 7

Various polycarbonate resin compositions were prepared by appropriately blending the following ingredients in various proportions as shown in Tables 1 to 3 by means of a tumbler: an aromatic polycarbonate resin (trade name "Iupilon S-3000", manufactured by Mitsubishi Gas Chemical Company, Inc., Japan), the polycarbonate polymers or oligomers as obtained in Synthesis Examples 1 to 3; the poly(alkylene glycol)s or poly(alkylene glycol) esters as specified below; pentaerythritol tetrastearate (hereinafter referred to as "PTS", containing no unsaturated double bond) or beeswax (hereinafter referred to as "BW", containing an unsaturated double bond), as a release agent; and tris(2,4-di-t-butylphenyl) phosphite (hereinafter referred to as "M2112"), bis(2,4-di-t-butylphenyl) pentaerythritol diphosphite (hereinafter referred to as "PEP24"), or bis(2,6-di-t-butylphenyl) pentaerythritol diphosphite (hereinafter referred to as "PEP36"), as a heat stabilizer. Each of the resulting mixtures was extruded with a single-screw vented extruder and formed into pellets.

The thus-obtained pellets were molded into 3.2 mm thick test pieces having a size of 50 mm × 60 mm by means of an injection molding machine (Neomat 110/45, manufactured by Sumitomo Heavy Industries, Ltd., Japan) at a resin temperature of 300° C., a mold temperature of 80° C., and an injection pressure of 1,200 kg/cm².

These molded test pieces were divided into two groups, and those in one group were irradiated in the air with 2.5 megarad gamma rays and those in another group were sealed together with a deoxidant (trade name "Ageless", manufactured by Mitsubishi Gas Chemical Company)and irradiated under oxygen-free conditions with 2.5 megarad gamma rays. The changes ($\Delta Y.I.$) in yellowness index (Y.I.) were measured with color difference meter SM-3-CH, manufactured by Suga Shikenki Co., Ltd., Japan.

Further, for the evaluation of heat stability, the viscosity average molecular weight (Mv) was measured before and after pellets were allowed to stand in a nitrogen atmosphere at 340° C. for 1 hour, and the difference therebetween was measured.

The results obtained are shown in Tables 1 to 3, in which the following abbreviations are used.

S-3000: Aromatic polycarbonate resin containing no halogen.
C-PC: Aromatic polycarbonate resin containing 4.46% Br.
HO-PC: Aromatic polycarbonate homooligomer containing 50.3% Br.
CO-PC: Aromatic polycarbonate cooligomer containing 39.7% Br.
PEG10: Poly(ethylene glycol) having a molecular weight of 1,000.
PPG20: Poly(propylene glycol) having a molecular weight of 2,000.
PPGST30: Poly(propylene glycol) distearate having a molecular weight of 3,000.
PPGPR40: Poly(propylene glycol) dibutyrate having a molecular weight of 4,000.
PPGOC20: Poly(ethylene glycol) dicaprylate having a molecular weight of 2,000.
PTS: Pentaerythritol tetrastearate.
BW: Beeswax.
M2112: Tris(2,4-di-t-butylphenyl) phosphite.
PEP24: Tris(2,4-di-t-butylphenyl) pentaerythritol diphosphite.
PEP36: Tris(2,6-di-t-butyl-4-methylphenyl) pentaerythritol diphosphite.
Mv: Viscosity average molecular weight as measured at 25° C. in 0.5 g/dl MC solution.

TABLE 1

|  |  |  | Example | | | | | |
|---|---|---|---|---|---|---|---|---|
|  |  |  | 1 | 2 | 3 | 4 | 5 | 6 |
| Components (parts) | Polycarbonate resin | S-3000 | 50 | 50 | 95 | 95 | 80 | 95 |
|  |  | C-PC | 50 | 50 |  |  | 20 | 4 |
|  |  | HO-PC |  |  | 5 |  |  | 1 |
|  |  | CO-PC |  |  |  | 5 |  |  |
|  | Poly(alkylene glycol) or its ester | PEG10 | 1.0 |  |  |  |  |  |
|  |  | PPG20 |  | 1.0 | 1.0 | 1.0 |  |  |
|  |  | PPGST30 |  |  |  |  | 0.7 |  |
|  |  | PPGPR40 |  |  |  |  |  | 0.6 |
|  |  | PEGOC20 |  |  |  |  |  |  |
| Br content (%) |  |  | 2.23 | 2.23 | 2.52 | 2.0 | 0.89 | 0.68 |
| Y.I. | Before γ-ray irradiation |  | 3.1 | 3.0 | 2.9 | 3.0 | 3.0 | 2.9 |
|  | After γ-ray irradiation | In air | 9.1 | 8.7 | 8.5 | 9.9 | 7.8 | 8.1 |
|  |  | Oxygen-free | 6.8 | 6.7 | 7.0 | 7.5 | 6.7 | 7.0 |
|  | ΔY.I. | In air | 6.0 | 5.7 | 5.6 | 7.1 | 4.8 | 5.2 |
|  |  | Oxygen-free | 3.7 | 3.7 | 4.1 | 4.7 | 3.7 | 4.1 |

TABLE 2

| | | | \multicolumn{7}{c}{Example} |
|---|---|---|---|---|---|---|---|---|---|
| | | | 7 | 8 | 9 | 10 | 11 | 12 | 13 |
| Components (parts) | Polycarbonate resin | S-3000 | 50 | 70 | 97 | 97 | 70 | 70 | 70 |
| | | C-PC | 50 | 30 | | | 30 | 30 | 30 |
| | | HO-PC | | | 3 | | | | |
| | | CO-PC | | | | 3 | | | |
| | Polyalkylene glycol or its ester | PPG10 | | | | | | | |
| | | PPG20 | 1.0 | | | | | | |
| | | PPGST30 | | 0.5 | | | 0.5 | 0.5 | 0.5 |
| | | PPGPR40 | | | 1.0 | | | | |
| | | PEGOC20 | | | | 0.7 | | | |
| | Release agent | PTS | 0.3 | 0.1 | | 0.05 | 0.1 | 0.1 | 0.1 |
| | Heat stabilizer | M2112 | | | | | 0.05 | | |
| | | PFP24 | | | | | | 0.05 | |
| | | PEP36 | | | | | | | 0.05 |
| Br content (%) | | | 2.23 | 1.34 | 1.51 | 1.20 | 1.34 | 1.34 | 1.34 |
| Y.I | Before γ-ray irradiation | | 2.9 | 2.7 | 2.6 | 2.8 | 2.6 | 2.5 | 2.5 |
| | After γ-ray irradiation | In air | 9.5 | 7.2 | 7.0 | 7.5 | 8.0 | 7.0 | 7.1 |
| | | Oxygen-free | 7.0 | 6.0 | 5.7 | 6.5 | 5.8 | 5.6 | 5.8 |
| | ΔY.I. | In air | 6.6 | 4.5 | 4.4 | 4.7 | 4.4 | 4.5 | 4.6 |
| | | Oxygen-free | 4.1 | 3.3 | 3.1 | 3.7 | 3.2 | 3.1 | 3.3 |
| Heat Stability Viscosity-average molecular weight ($Mv \times 10^{-3}$) | Before treatment | | — | 22 | 22 | 22 | 22 | 22 | 22 |
| | After treatment | | — | 21 | 20 | 20 | 22 | 22 | 22 |
| | Decrease | | — | 1 | 2 | 2 | 0 | 0 | 0 |

TABLE 3

| | | | \multicolumn{7}{c}{Comparative Example} |
|---|---|---|---|---|---|---|---|---|---|
| | | | 1 | 2 | 3 | 4 | 5 | 6 | 7 |
| Components (parts) | Polycarbonate resin | S-3000 | 100 | 100 | 100 | 70 | 50 | 70 | 50 |
| | | C-PC | | | | 30 | 50 | 30 | 50 |
| | Polyalkylene glycol | PEG10 | | 1.0 | | | | | |
| | | PPG20 | | | 1.0 | | | 1.0 | 1.0 |
| | Release agent | BW | | | | | | 0.3 | 0.3 |
| Br content (%) | | | 0 | 0 | 0 | 1.34 | 2.23 | 1.34 | 2.23 |
| Y.I | Before γ-ray irradiation | | 3.0 | 2.8 | 2.8 | 2.8 | 2.8 | 2.7 | 3.0 |
| | After γ-ray irradiation | In air | 32.7 | 32.0 | 32.0 | 13.4 | 11.3 | 31.6 | 31.4 |
| | | Oxygen-free | 57.6 | 48.2 | 48.2 | 8.5 | 7.7 | 59.2 | 61.2 |
| | ΔY.I | In air | 29.7 | 29.2 | 29.2 | 10.6 | 8.5 | 28.9 | 28.4 |
| | | Oxygen-free | 54.6 | 45.4 | 45.4 | 5.7 | 4.9 | 56.5 | 58.2 |
| Heat Stability Viscosity-average molecular weight ($Mv \times 10^{-3}$) | Before treatment | | 22 | 22 | — | 22 | — | 22 | — |
| | After treatment | | 21 | 16 | — | 21 | — | 17 | — |
| | Decrease | | 1 | 6 | — | 1 | — | 5 | — |

As described above, the composition of this invention can be advantageously used as medical cases such as those used in artificial dialyzers, artificial lungs, and blood transfusion sets, which are to be undergo radiation sterilization (generally, gamma ray or electron beam sterilization).

While the invention has been described in detail and with reference to specific embodiments thereof, it will be apparent to one skilled in the art that various changes and modifications can be made therein without departing from the spirit and scope thereof.

What is claimed is:

1. A polycarbonate resin composition for radiation sterilization, which consists essentially of:

(A) an aromatic polycarbonate resin containing an aromatic polycarbonate polymer or oligomer having in its molecular chain a structural unit derived from a halogenated bisphenol wherein said aromatic polycarbonate resin has a halogen content of from 0.3 to 5% by weight;

(B) a polyalkylene compound (a) selected from the group consisting of poly(alkylene glycol)s, poly(alkylene glycol) ethers, poly(alkylene glycol)silyl ethers, and poly(alkylene glycol) esters, and (b) represented by the following formula (1):

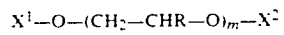

$$X^1-O-(CH_2-CHR-O)_m-X^2 \quad (2)$$

wherein

R represents hydrogen or a lower alkyl group, $X^1$ and $X^2$ each represent hydrogen, an alkyl group having 1 to 10 carbon atoms, an acyl group having 2 to 35 carbon atoms, an aryl group having 6 to 12 carbon atoms, or $-Si(R^1)_3$ group, wherein the $R^1$s, which may be the same or different, each represent an alkyl group having 1 to 10 carbon atoms or an aryl group having 6 to 10 carbon atoms, and m is an integer of 1 to 1,000, wherein (B) is present in an amount effective to prevent yellowing by said radiation sterilization, and (C) 0.01 to 3% by weight based on the weight of component (A) of at least one release agent selected from the group consisting of esters of saturated higher fatty acids with saturated alcohols, paraffins, and low molecular weight polyolefins.

2. A polycarbonate resin composition as claimed in claim 1, wherein said polyalkylene compound (B) is a poly(alkylene glycol) ester and the amount thereof is from 0.1 to 5% by weight based on the weight of component (A).

3. A polycarbonate resin composition as claimed in claim 1, wherein the amount of said release agent is from 0.1 to 1% by weight.

4. A polycarbonate resin composition as claimed in claim 1, which further comprises 0.001 to 0.1% by weight based on the weight of component (A) of at least one heat stabilizer selected from the group consisting of phosphorous acid and phosphorous esters.

5. A polycarbonate resin composition as claimed in claim 1, wherein said halogenated bisphenol is 2,2-bis(4-hydroxy-3,5-dibromophenyl)propane.

* * * * *